US012693527B2

(12) United States Patent
Ishii et al.

(10) Patent No.: US 12,693,527 B2
(45) Date of Patent: Jul. 28, 2026

(54) OPTICAL DEVICE AND IMAGE PICKUP UNIT INCLUDING OPTICAL DEVICE

(71) Applicant: Murata Manufacturing Co., Ltd., Nagaokakyo (JP)

(72) Inventors: Yuuki Ishii, Nagaokakyo (JP); Noritaka Kishi, Nagaokakyo (JP); Hitoshi Sakaguchi, Nagaokakayo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 174 days.

(21) Appl. No.: 18/817,619

(22) Filed: Aug. 28, 2024

(65) Prior Publication Data

US 2024/0418985 A1     Dec. 19, 2024

Related U.S. Application Data

(63) Continuation of application No. PCT/JP2023/004330, filed on Feb. 9, 2023.

(30) Foreign Application Priority Data

Apr. 28, 2022    (JP) ................................. 2022-075150

(51) Int. Cl.
*G02B 27/00*        (2006.01)
*G02B 7/02*         (2021.01)
        (Continued)

(52) U.S. Cl.
CPC ......... *G02B 27/0006* (2013.01); *G02B 7/021* (2013.01); *G02B 13/003* (2013.01); *H04N 23/55* (2023.01)

(58) Field of Classification Search
CPC ........ G02B 27/0006; G02B 7/00; G02B 7/02; G02B 7/021; G02B 13/00; G02B 13/001;
        (Continued)

(56) References Cited

U.S. PATENT DOCUMENTS 11,012,597 B2     5/2021   Fujimoto et al.
11,503,190 B2     11/2022  Sakaguchi et al.
                  (Continued)

FOREIGN PATENT DOCUMENTS

JP      2017-170303 A    9/2017
WO      2019/130623 A1   7/2019
                (Continued)

OTHER PUBLICATIONS

International Search Report received for PCT Patent Application No. PCT/JP2023/004330, mailed on Mar. 14, 2023, 2 pages (English Translation Only).

*Primary Examiner* — Stephone B Allen
*Assistant Examiner* — Adam W Booher
(74) *Attorney, Agent, or Firm* — ArentFox Schiff LLP

(57)        ABSTRACT

The present disclosure provides an optical device that reduces stress concentration on a vibrator while removing foreign matter adhering to a light-transparent body covering the exterior of the optical device with vibrations, and to provide an image pickup unit including the optical device. An optical device includes an outermost-layer lens, a housing, a vibrator, and a piezoelectric device. The outermost-layer lens is transparent to light of a predetermined wavelength. The housing holds the outermost-layer lens. The vibrator is in contact with the outermost-layer lens held by the housing. The piezoelectric device is disposed on the vibrator to vibrate the vibrator. The vibrator is a tubular body, and includes a connector that is in contact with the outermost-layer lens, a vibrating portion on which a piezoelectric device is disposed, and a supporter that connects the connector and the vibrating portion to each other and that has a curved cross-sectional shape.

20 Claims, 10 Drawing Sheets

(51) Int. Cl.
    G02B 13/00         (2006.01)
    H04N 23/55      (2023.01)

(58) Field of Classification Search
    CPC ............. G02B 13/0015; G02B 13/003; G02B 13/005; G02B 13/0055; H04N 23/55; H04N 23/52
    See application file for complete search history.

(56)           References Cited

U.S. PATENT DOCUMENTS

| | | |
|---|---|---|
| 2020/0213495 A1 | 7/2020 | Fujimoto et al. |
| 2020/0225466 A1 | 7/2020 | Sakaguchi et al. |
| 2021/0154702 A1* | 5/2021 | Fujimoto ............... G03B 17/08 |

FOREIGN PATENT DOCUMENTS

| | | |
|---|---|---|
| WO | 2019/130629 A1 | 7/2019 |
| WO | 2021/038942 A1 | 3/2021 |
| WO | 2021/100228 A1 | 5/2021 |

* cited by examiner

OPTICAL DEVICE AND IMAGE PICKUP UNIT INCLUDING OPTICAL DEVICE

CROSS REFERENCE TO RELATED APPLICATIONS

This application is a continuation of International Application No. PCT/JP2023/004330, filed Feb. 9, 2023, which claims priority to Japanese Patent Application No. 2022-075150, filed Apr. 28, 2022, the entire contents of each of which are hereby incorporated by reference in their entirety.

TECHNICAL FIELD

The present disclosure is directed to an optical device, and an image pickup unit including an optical device.

BACKGROUND

An image pickup unit is installed at a vehicle front or rear to control a safety device or driving support using images obtained by the image pickup unit. Such an image pickup unit is usually disposed outside the vehicle. Thus, foreign matter such as raindrops (waterdrops), mud, or dust may adhere to a light-transparent body (a protective cover or a lens) covering the exterior of the image pickup unit.

When foreign matter adheres to the light-transparent body, the image pickup unit captures an image including the foreign matter, and fails to obtain a clear image. For example, in Japanese Unexamined Patent Application Publication No. 2017-170303 (hereinafter the "'303 Application"), an image pickup unit includes a vibrator that vibrates a light-transparent body to remove foreign matter adhering to the surface of the light-transparent body.

In the image pickup unit described in the '303 Application, the light-transparent body (drip proof cover) includes a dome portion, a cylindrical portion, and a flange portion. The flange portion is disposed throughout in the circumferential direction of the cylindrical portion near a coupling portion between the base end of the dome portion and the cylindrical portion to extend outward from the portion, and has an annular surface orthogonal to the optical axis. On a rear surface of the flange portion, a plate-shaped piezoelectric device is disposed.

When the piezoelectric device is to vibrate the drip proof cover, the vibrations of the piezoelectric device are to be transmitted to the dome portion through the flange portion. In other words, the flange portion functions as a vibrator that transmits the vibrations of the piezoelectric device to the dome portion. However, vibrating the dome portion concentrates stress on the connection portion between the flange portion and the dome portion, and the portion may be cracked.

SUMMARY OF THE INVENTION

In view of the foregoing, the present disclosure provides an optical device that reduces stress concentration on a vibrator while removing foreign matter adhering to a light-transparent body covering the exterior of the optical device with vibrations. In addition, an image pickup unit is provided that includes the optical device.

In some aspects, the techniques described herein relate to an optical device, including: a light-transparent body being transparent to light of a predetermined wavelength; a housing configured to hold the light-transparent body; a vibrator in contact with the light-transparent body configured to be held by the housing; and a piezoelectric device disposed on the vibrator and configured to vibrate the vibrator, wherein the vibrator is a tubular body, and includes a first portion that is in contact with the light-transparent body, a second portion on which a piezoelectric device is disposed, and a third portion that connects the first portion and the second portion to each other and has a curved cross-sectional shape.

In some aspects, the techniques described herein relate to an image pickup unit, including: an optical device including: a light-transparent body being transparent to light of a predetermined wavelength; a housing configured to hold the light-transparent body; a vibrator in contact with the light-transparent body configured to be held by the housing; and a piezoelectric device disposed on the vibrator and configured to vibrate the vibrator, wherein the vibrator is a tubular body, and includes a first portion that is in contact with the light-transparent body, a second portion on which a piezoelectric device is disposed, and a third portion that connects the first portion and the second portion to each other and has a curved cross-sectional shape; and an image pickup device disposed to have the light-transparent body in a field of view.

According to the present disclosure, a vibrator is a tubular body, and includes a first portion that is in contact with a light-transparent body, a second portion on which a piezoelectric device is disposed, and a third portion that connects the first portion and the second portion to each other and that has a curved cross-sectional shape. The optical device with this structure can thus reduce stress concentration on the vibrator, and reduce occurrence of cracks.

BRIEF DESCRIPTION OF DRAWINGS

In the descriptions that follow, like parts are marked throughout the specification and drawings with the same numerals, respectively. The drawings are not necessarily drawn to scale and certain drawings may be illustrated in exaggerated or generalized form in the interest of clarity and conciseness. The disclosure itself, however, as well as a mode of use, further features and advances thereof, will be understood by reference to the following detailed description of illustrative implementations of the disclosure when read in conjunction with reference to the accompanying drawings, wherein.

DETAILED DESCRIPTION OF EMBODIMENTS

Figure 1:
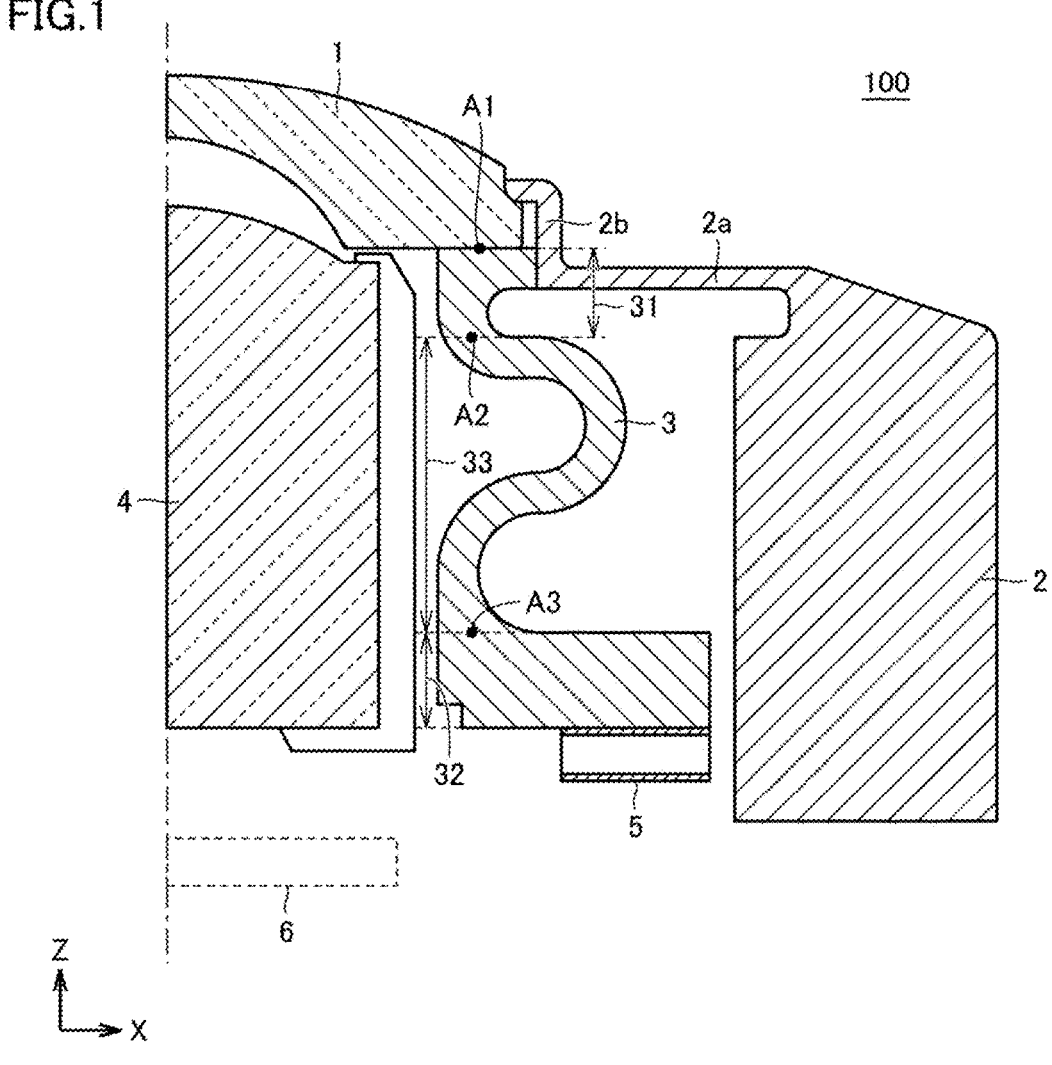
FIG. 1 is a half-sectional view of an optical device in accordance with aspects of the present disclosure.

Hereinbelow, aspects of the present disclosure will be described. In a following description of the drawings, the same or similar components will be represented with use of the same or similar reference characters. The drawings are exemplary, sizes or shapes of portions are schematic, and technical scope of the present disclosure should not be understood with limitation to the aspects.

With reference to the drawings, an optical device according to an aspect and an image pickup unit including the optical device are described below in detail. Throughout the drawings, the same reference signs denote the same or corresponding components. The optical device described below is applicable to, for example, a vehicle-mounted image pickup unit, and can vibrate a light-transparent body (such as an outermost-layer lens) to remove foreign matter adhering to the surface of the light-transparent body. The optical device is not limited to being included in a vehicle-mounted image pickup unit. For example, the optical device may also be applicable to a surveillance camera for security, or an image pickup unit mounted on or to a drone.

FIG. 1 is a half-sectional view of an optical device 100 according to an aspect of the present disclosure. An X-direction and a Z-direction in the drawings denote the lateral direction and the height direction of the optical device 100. The dot-and-dash line illustrated in FIG. 1 passes through the center axis of the optical device 100. The optical device 100 includes an outermost-layer lens 1, a housing 2, a vibrator 3, an inner-layer lens 4, and a piezoelectric device 5.

After alignment between the outermost-layer lens 1 and the inner-layer lens 4 is adjusted, a casing including an image pickup device 6 is attached to the optical device 100 to form an image pickup unit. The image pickup unit includes the optical device 100 and the image pickup device 6 disposed to have the outermost-layer lens 1 and the inner-layer lens 4 in their field of view. The image pickup device 6 is, for example, an image sensor such as a charge coupled device (CCD) or a complementary metal-oxide-semiconductor (CMOS) sensor, and mounted on a circuit board not illustrated.

The outermost-layer lens 1 is a light-transparent body that is transparent to light of a predetermined wavelength (for example, a wavelength of visible light or a wavelength capturable by an image pickup device), for example, a convex meniscus lens. The optical device 100 may include a transparent member such as a protective cover instead of the outermost-layer lens 1. The protective cover is formed from glass or resin such as transparent plastics.

The end portion of the outermost-layer lens 1 is held at the end portion of a leaf spring 2a extending from the housing 2. An adhesive is filled in a space between the outermost-layer lens 1 and a retainer 2b formed from the end portion of the leaf spring 2a. The optical device 100 further includes a vibrator 3 at a position to be in contact with the outermost-layer lens 1 held by the housing to vibrate the outermost-layer lens 1.

Figure 2A:
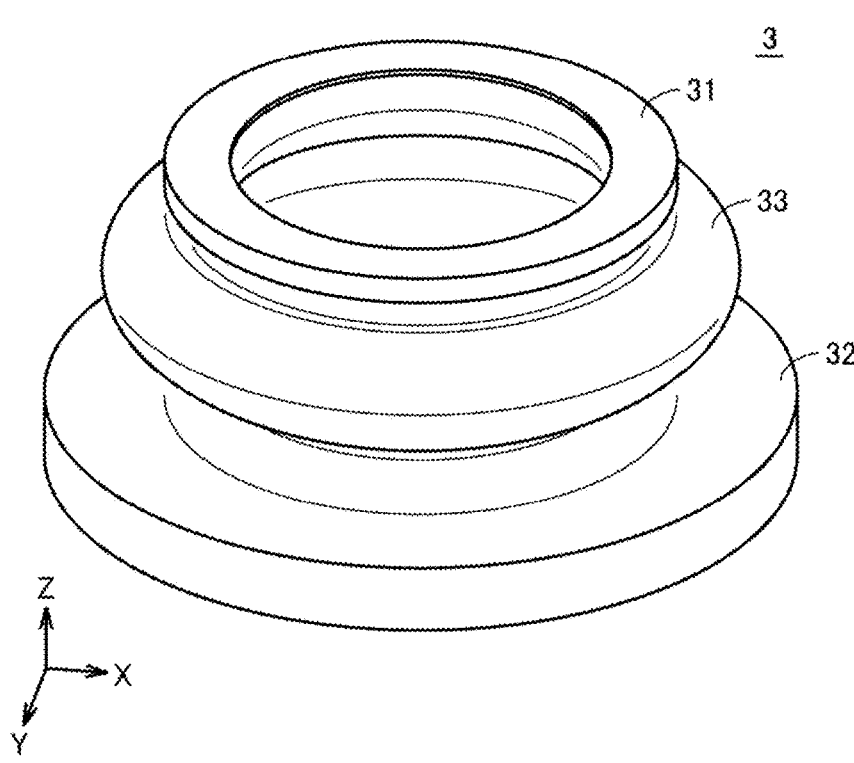
FIG. 2(a) and FIG. 2(b) are schematic diagrams of a vibrator in accordance with aspects of the present disclosure.
Figure 2B:
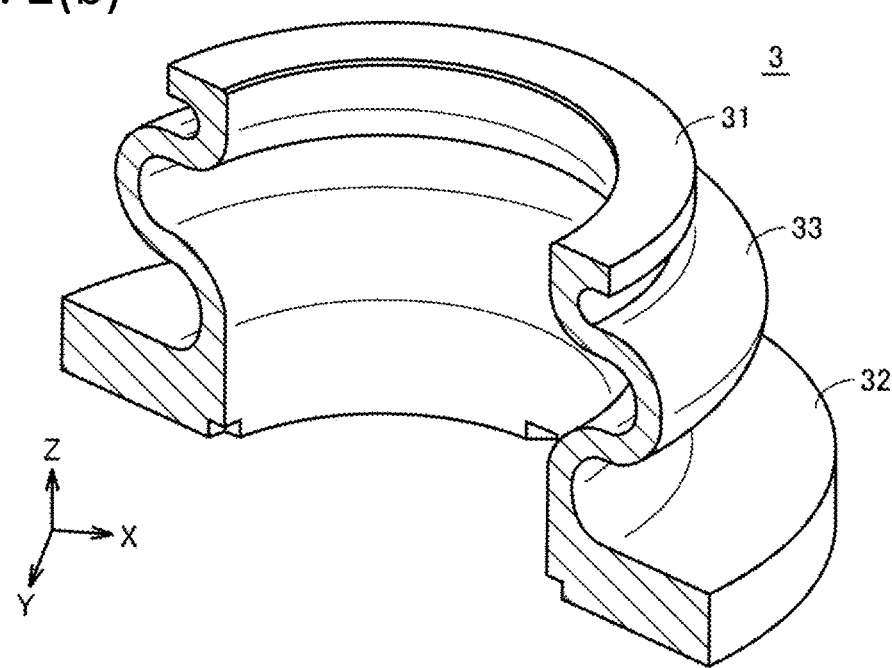

FIG. 2(*a*) and FIG. 2(*b*) are schematic diagrams of the vibrator 3 according to an aspect of the present disclosure. FIG. 2(*a*) is a perspective view of the vibrator 3, and FIG. 2(*b*) is a cross-sectional perspective view of the vibrator 3. As illustrated in FIGS. 2(*a*) and 2(*b*), the vibrator 3 is a tubular body, and includes a connector 31 (a first portion)

that is in contact with the outermost-layer lens 1, a vibrating portion 32 (a second portion) on which the piezoelectric device 5 is disposed, and a supporter 33 (a third portion) that connects the connector 31 and the vibrating portion 32 to each other. The supporter 33 has an S-shaped cross section. As illustrated in FIG. 1, the vibrator 3 has a shape in which a connection point A1 between the outermost-layer lens 1 and the connector 31, a connection point A2 between the connector 31 and the supporter 33, and a connection point A3 between the supporter 33 and the vibrating portion 32 are disposed on a substantially straight line. As illustrated in FIG. 1, the inner-layer lens 4 is disposed inside the vibrator 3.

The connector 31 has a cylindrical shape obtained by extending the tubular body in the axial direction (the Z-direction). The end portion of the connector 31 can be stably connected to the peripheral portion of the outermost-layer lens 1 by extending in the radial direction (the X-direction and the Y-direction) of the tubular body. The connector 31 may simply include a portion extending in the axial direction (the Z-direction) of the tubular body or a portion extending in the radial direction (the X-direction and the Y-direction) of the tubular body. The vibrating portion 32 is a portion that vibrates together with the vibrations of the piezoelectric device 5, and has a larger thickness than the connector 31 and the supporter 33. This structure can more efficiently transmit the vibrations of the piezoelectric device 5 to the outermost-layer lens 1. The supporter 33 is a portion that supports the connector 31 and transmits the vibrations of the vibrating portion 32 to the connector 31. The connector 31, the vibrating portion 32, and the supporter 33 may be integrated with one another, or formed separately. As illustrated in FIGS. 2(*a*) and 2(*b*), the maximum outside dimension of the supporter 33 (the third portion) is larger than the maximum outside dimension of the connector 31 (the first portion), and the maximum outside dimension of the vibrating portion 32 (the second portion) is larger than the maximum outside dimension of the supporter 33 (the third portion). This structure can efficiently transmit the vibrations of the vibrating portion 32 (that is, the vibrations of the piezoelectric device 5) to the outermost-layer lens 1 (light-transparent body).

The piezoelectric device 5 is disposed on the surface of the vibrating portion 32 opposite to the surface located closer to the surface that is in contact with the outermost-layer lens 1. The piezoelectric device 5 is hollow, and vibrates, for example, when being polarized in a thickness direction. The piezoelectric device 5 is formed from lead zirconate titanate piezoelectric ceramics. Further, other piezoelectric ceramics such as $(K, Na)NbO_3$ piezoelectric ceramics may be used. Alternatively, piezoelectric single crystals such as $LiTaO_3$ may be used. The piezoelectric device 5 may be disposed on the surface of the vibrating portion 32, the same as the surface located closer to the surface that is in contact with the outermost-layer lens 1.

Figure 3:
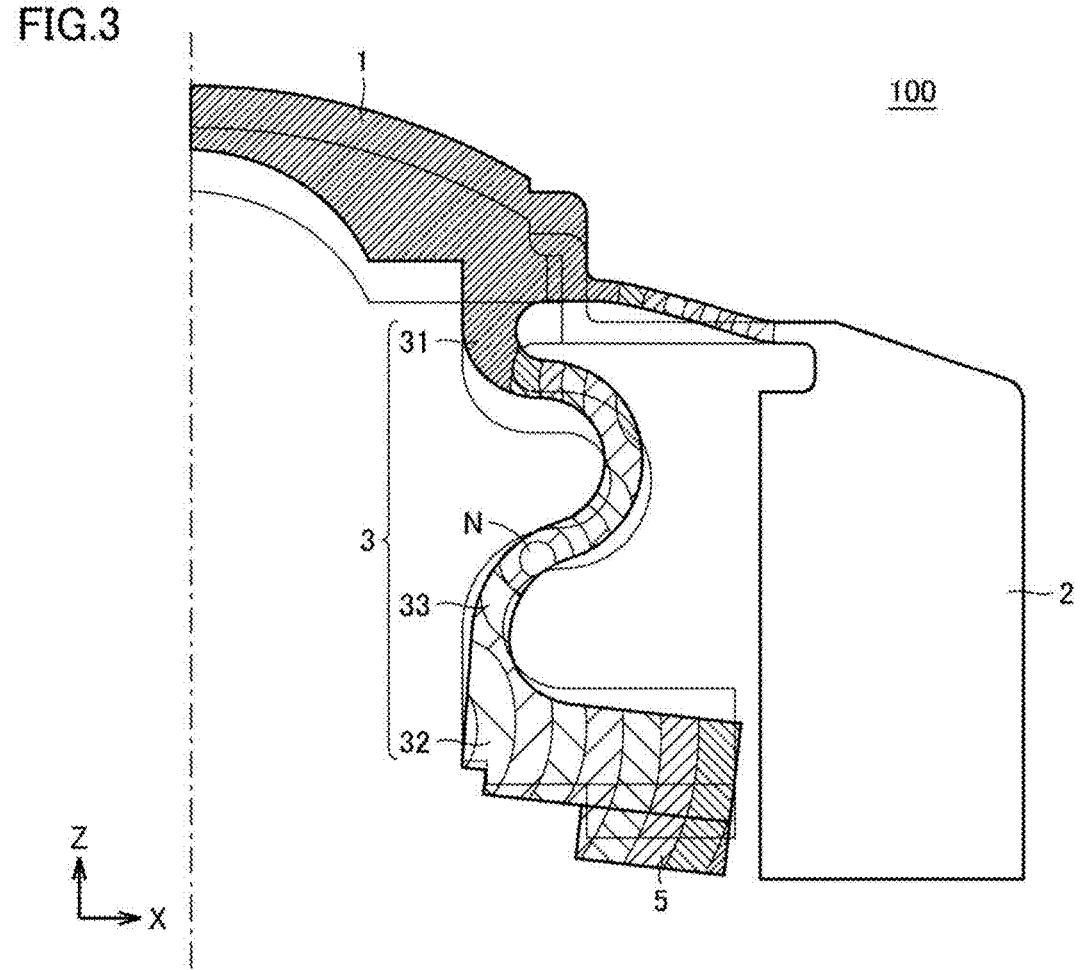
FIG. 3 is a schematic diagram illustrating displacement that occurs in an optical device in accordance with aspects of the present disclosure.

When the hollow circular piezoelectric device 5 vibrates in the radial direction and the vibrations are transformed by the supporter 33 of the vibrator 3 into the vibrations in the Z-direction (vertical direction in the drawing), the outermost-layer lens 1 vibrates in the Z-direction. FIG. 3 is a schematic diagram illustrating displacement caused in the optical device 100 according to an aspect of the disclosure. As illustrated in FIG. 3, the vibrator 3 displaces the outermost-layer lens 1 in the Z-direction base on the supporter 33 being elastically deformed like a spring. The vibrations of the vibrator 3 also elastically deforms the leaf spring 2a of the housing 2 that holds the outermost-layer lens 1.

As illustrated in FIG. 3, the vibrator 3 has a vibration node N at the middle of a portion of the supporter 33 having an S-shaped cross section. The vibration node N is a portion having an amplitude that is smaller than or equal to approximately one-fiftieth of the maximum amplitude of the vibrator 3. Thus, the vibrations of the vibrator 3 provides maximum displacement to the outermost-layer lens 1, and displacement to the vibration node N. In FIG. 3, variable density of hatching indicates the amount of displacement, and the portion with thick hatching indicates a portion with large displacement. The outermost-layer lens 1 has large displacement.

Figure 4A:
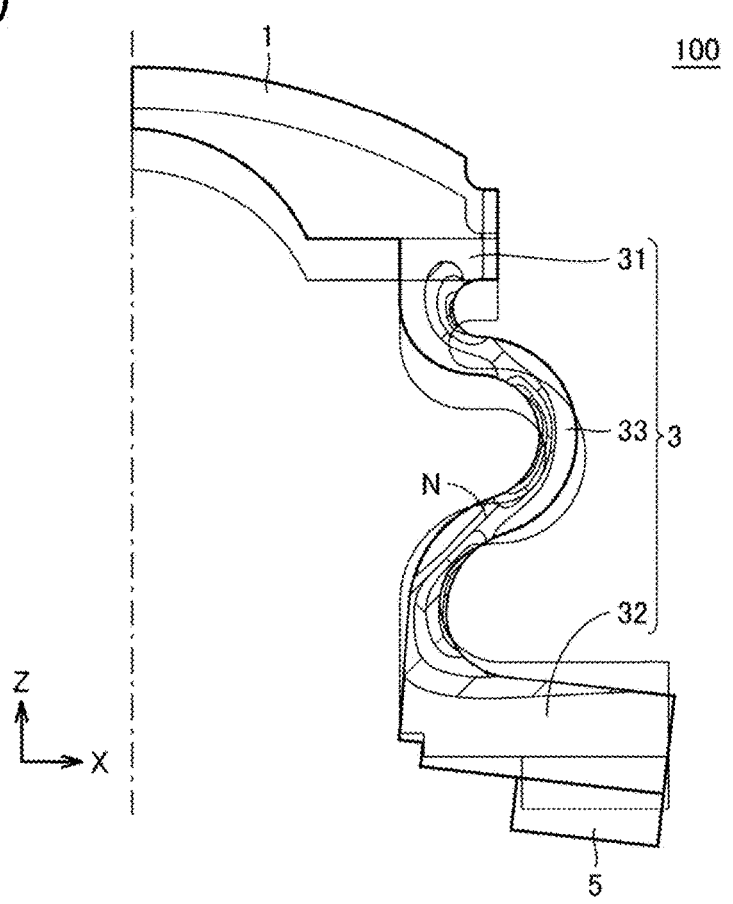
FIG. 4(a) and FIG. 4(b) are schematic diagrams illustrating stress that occurs in an optical device in accordance with aspects of the present disclosure.

In an aspect of the present disclosure, the supporter 33 has an S-shaped cross section, and has the vibration node N at the middle of a portion having an S shape. In other words, the supporter 33 has a curved shape around the vibration node N. Thus, the vibrator 3 has a shape that reduces stress concentration, and thus can notably reduce occurrence of cracks. FIGS. 4(a) and 4 (b) are schematic diagrams illustrating stress that occurs in an optical device according to an aspect of the disclosure. FIG. 4(a) is a schematic diagram illustrating stress that occurs in the optical device 100, and FIG. 4(b) is a schematic diagram illustrating stress that occurs in an optical device 500 according to a comparative example.

Figure 4B:
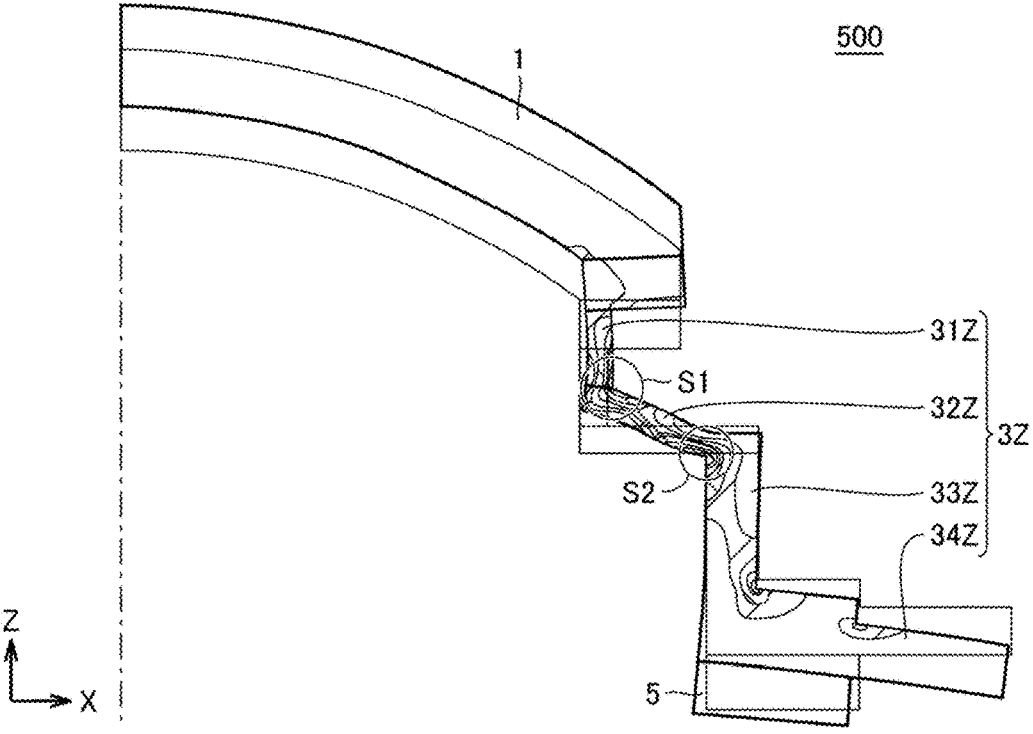

FIG. 4(a) and FIG. 4(b) each illustrate stress that occurs in a vibrator caused when the piezoelectric device 5 is vibrated and the vibrator vibrates the outermost-layer lens 1 in a piston manner in the Z-direction. In the optical device 500 of a comparative example illustrated in FIG. 4(b), the piezoelectric device 5 is vibrated, and a vibrator 3Z vibrates the outermost-layer lens 1 in a piston manner in the Z-direction. The vibrator 3Z includes a first cylinder portion 31Z that supports the outermost-layer lens 1, a hollow circular spring 32Z, a second cylinder portion 33Z, and a brim 34Z that has a surface on which the piezoelectric device 5 is disposed. In the optical device 500, stress concentrates on a connector S1 between the first cylinder portion 31Z and the spring 32Z, and a connector S2 between the spring 32Z and the second cylinder portion 33Z. In FIG. 4(b), variable density of hatching indicates the degree of stress, and the portion with thick hatching indicates a portion with large stress. Stress concentrates on the connectors S1 and S2.

In the optical device 500 of a comparative example illustrated in FIG. 4(b), the vibrator 3Z has a structure that bends and vibrates to vibrate the outermost-layer lens 1 in a piston manner in the Z-direction. Thus, stress concentrates on the connectors S1 and S2. In the optical device 100 illustrated in FIG. 4(a), the supporter 33 having a structure that vibrates in the Z-direction like a spring vibrates the outermost-layer lens 1 in a piston manner in the Z-direction. Thus, stress does not concentrate on the vibration node N. More specifically, in the optical device 100, the supporter 33 has an S-shaped cross section, and the supporter 33 reduces a portion on which stress concentrates. Thus, the optical device 100 reduces the entire stress. In the optical device 500 of a comparative example illustrated in FIG. 4(b), stress per unit displacement is 56.4 MPa/um at maximum, whereas in the optical device 100 illustrated in FIG. 4(a), stress per unit displacement is 20.7 MPa/um at maximum. More specifically, in the optical device 100 illustrated in FIG. 4(a), stress that occurs in the supporter 33 is reduced to smaller than or equal to ½ of the stress that occurs in the optical device 500 according to the comparative example in FIG. 4(b).

Figure 5A:
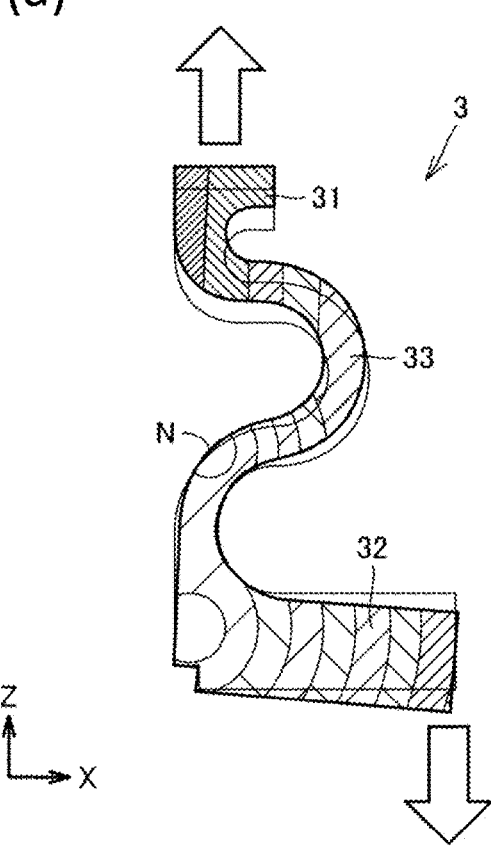
FIG. 5(a) and FIG. 5(b) are schematic diagrams illustrating displacement caused by vibrations of an optical device in accordance with aspects of the present disclosure.
Figure 5B:
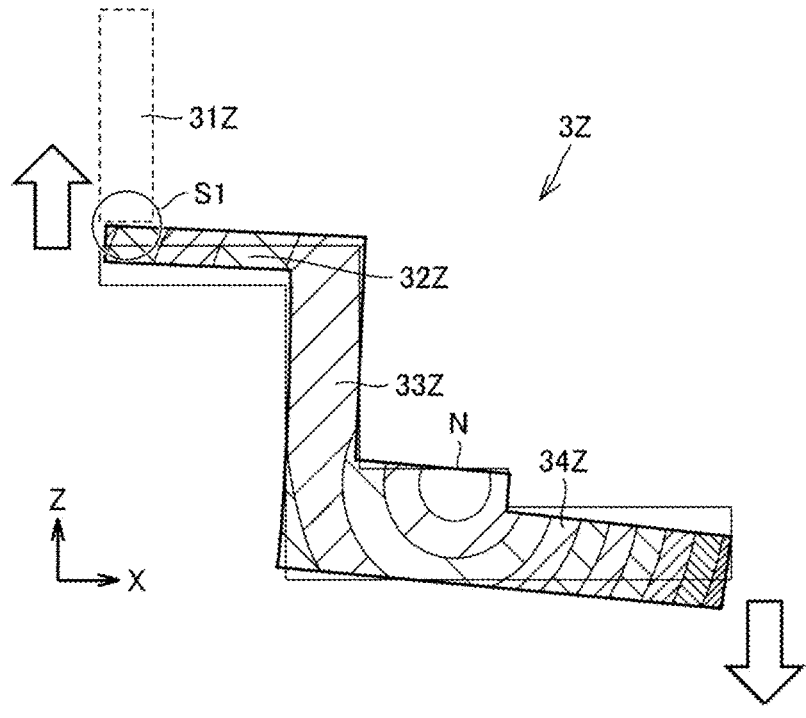

Displacement due to vibrations of the optical device 500 according to the comparative example and the optical device 100 is described below. FIG. 5(a) and FIG. 5(b) are schematic diagrams illustrating displacement caused by vibrations of an optical device according to an aspect of the present disclosure. FIG. 5(a) is a schematic diagram illustrating displacement due to vibrations of the optical device 100, and FIG. 5(b) is a schematic diagram illustrating displacement due to vibrations of the optical device 500 according to the comparative example.

In the optical device 500 according to the comparative example illustrated in FIG. 5(b), when the vibrator 3Z is vibrated at its natural vibration (for example, 29 kHz), the vibrator 3Z that has its vibration node N at the brim 34Z extending from the end portion of the second cylinder portion 33Z bends and vibrates with respect to the node N. In other words, the vibrator 3Z of a comparative example vibrates with respect to the node N to allow the spring 32Z and the brim 34Z to bend like a seesaw.

As illustrated in FIG. 5(b), the first cylinder portion 31Z located above the spring 32Z vibrates in a piston manner in the Z-direction due to the bending vibrations of the vibrator 3Z. With the vibrations, the first cylinder portion 31Z itself retains its original shape without being deformed. In contrast, the end portion of the spring 32Z is largely displaced. Thus, as illustrated in FIG. 4(b), stress concentrates on the connector S1 between the first cylinder portion 31Z and the spring 32Z. In FIG. 5(b), variable density of hatching indicates the amount of displacement, and the portion with thick hatching indicates a portion with large displacement. A portion located farther from the node N has large displacement.

In contrast, as illustrated in FIG. 5(a), in the optical device 100, when the vibrator 3 is vibrated as its natural vibration (for example, 29 kHz), the vibrator 3 that has its vibration node N at the middle of the S-shaped supporter 33 does not bend or vibrate with respect to the node N. The vibrator 3 vibrates to expand and contract in the Z-direction like a spring, rather than bending and vibrating. When the vibrator 3 vibrates like a spring, the vibrator 3 has no portion on which stress is localized, and thus stress concentration can be reduced. In the optical device 100, reduction of stress concentration caused by vibrations can reduce the frequency of an error mode in which the vibrator 3 is cracked. The optical device 100 can thus improve its reliability.

Figure 6A:
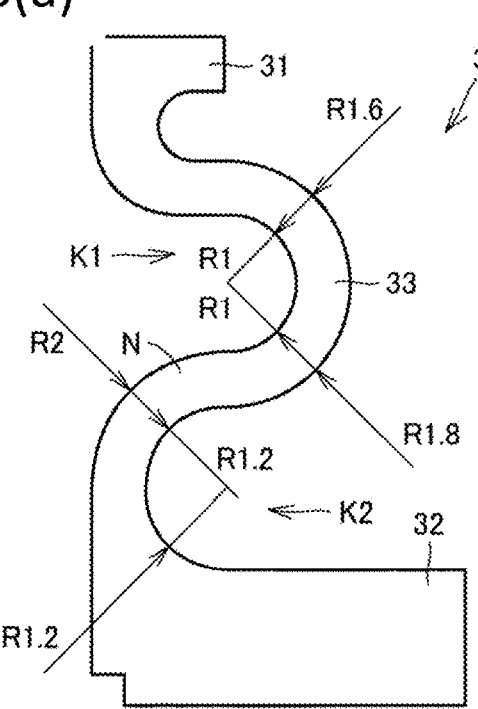
FIG. 6(a) and FIG. 6(b) are schematic diagrams illustrating a radius of curvature of a vibrator in accordance with aspects of the present disclosure.
Figure 6B:
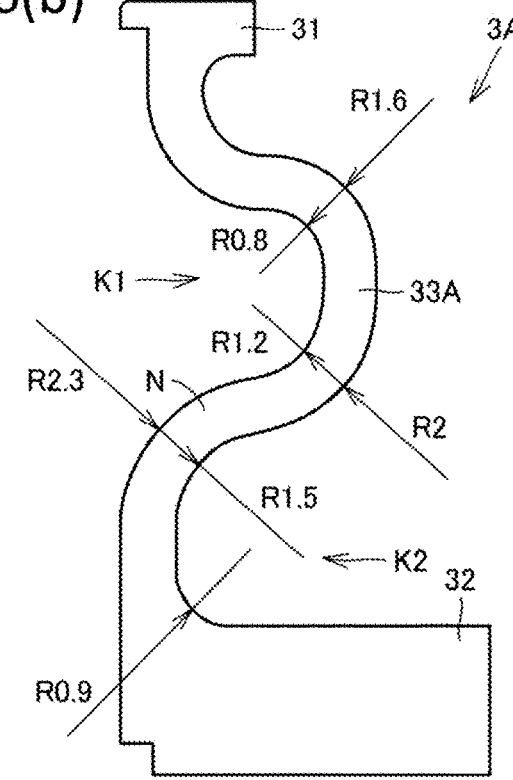

The optical device 100 includes the supporter 33 having an S-shaped cross section to reduce stress concentration on the vibrator 3. Instead of the supporter 33 that connects the connector 31 and the vibrating portion 32 to each other and that has an S-shaped cross section, the vibrator 3 having any curved shape can reduce stress concentration. Now, how much stress concentration can be reduced when the radius of curvature of the vibrator 3 is changed is described in detail. FIG. 6(a) and FIG. 6(b) are schematic diagrams illustrating the radius of curvature of a vibrator according to an aspect of the disclosure.

FIG. 6(a) illustrates the radius of curvature of the vibrator 3 illustrated in FIG. 1. An upper curved shape K1 of the supporter 33 in the drawing has an inner radius of curvature of 1 mm, and an outer radius of curvature of 1.8 mm. A lower curved shape K2 of the supporter 33 in the drawing has an inner radius of curvature of 1.2 mm, and an outer radius of curvature of 2 mm. More specifically, in the supporter 33, the portion located closer to the vibrating portion 32 has a larger radius of curvature than the portion located closer to the connector 31. The supporter 33 with this shape has a structure that more easily vibrates like a spring in the Z-direction.

FIG. 6(*b*) illustrates a radius of curvature of a vibrator 3A having a larger radius of curvature around the node N than the vibrator 3 illustrated in FIG. 1. A curved shape K1 of a supporter 33A has an inner radius of curvature of 0.8 mm, and an outer radius of curvature of 1.6 mm at a portion located closer to the connector 31, and has an inner radius of curvature of 1.2 mm and an outer radius of curvature of 2 mm at a portion located farther from the connector 31. A curved shape K2 of the supporter 33A has an inner radius of curvature of 1.5 mm and an outer radius of curvature of 2.3 mm at a portion located farther from the vibrating portion 32, and has an inner radius of curvature of 0.9 mm at a portion located closer to the vibrating portion 32. More specifically, in the supporter 33A, the portion located closer to the node N has a larger radius of curvature than the portion located farther from the node N.

Figure 7:
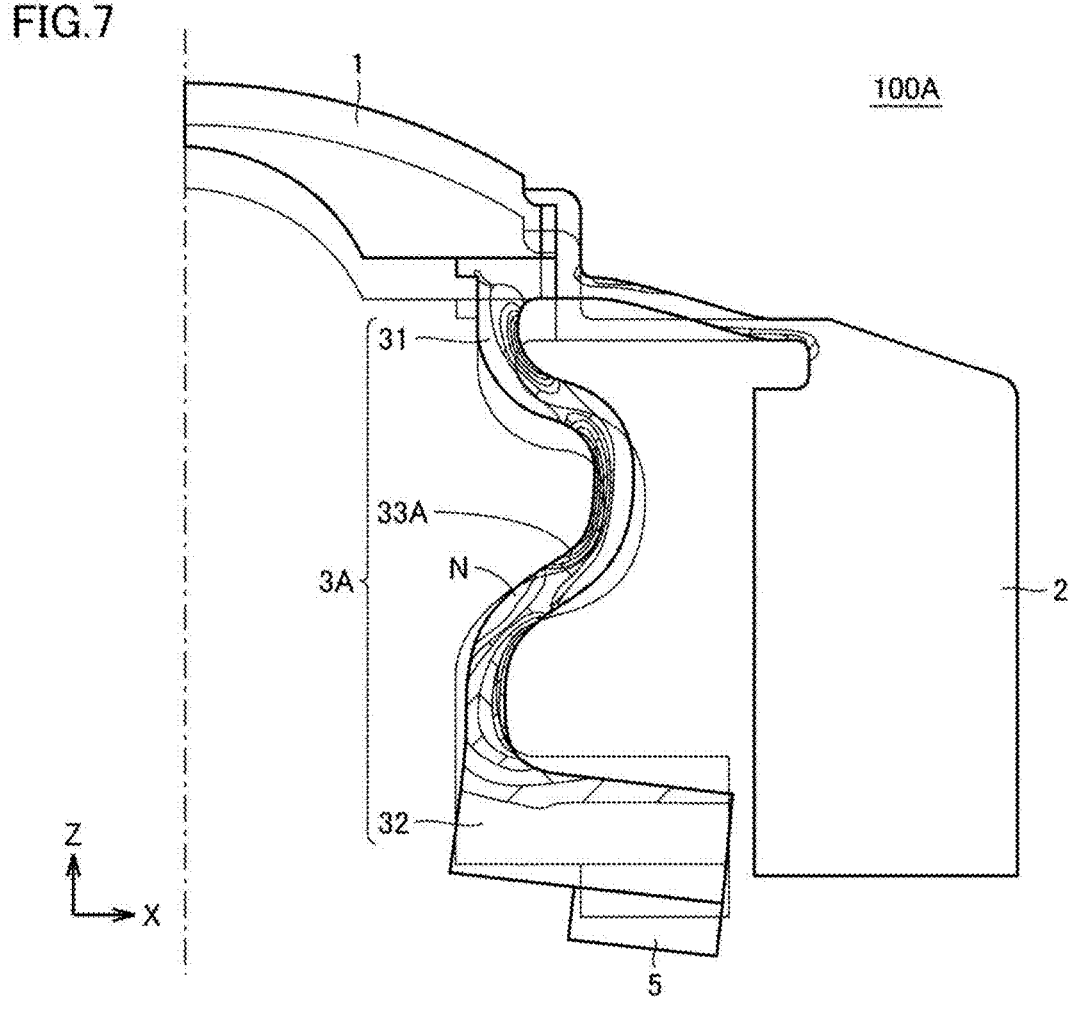
FIG. 7 is a schematic diagram illustrating stress caused in an optical device including a vibrator having a radius of curvature changed in accordance with aspects of the present disclosure.

FIG. 7 is a schematic diagram illustrating stress that occurs in an optical device 100A including the vibrator 3A having a radius of curvature changed. In the optical device 100A illustrated in FIG. 7, the same components as those in the optical device 100 illustrated in FIG. 1 are denoted with the same reference signs without being described again.

FIG. 7 illustrates stress that occurs in the vibrator 3A when the piezoelectric device 5 is vibrated and the vibrator 3A vibrates the outermost-layer lens 1 in a piston manner in the Z-direction. As illustrated in FIG. 7, in the optical device 100A, the vibrator 3A vibrates the outermost-layer lens 1 in a piston manner in the Z-direction. Thus, the supporter 33A has a larger radius of curvature around the node N. Thus, when the supporter 33A is vibrated in the Z-direction like a spring, stress is concentrated on a smaller portion in the supporter 33A, and thus the entire stress is reduced. The optical device 100 illustrated in FIG. 4(*a*) has a maximum stress per unit displacement of 20.7 MPa/um, whereas the optical device 100A illustrated in FIG. 7 has a maximum stress per unit displacement of 17.3 MPa/um. More specifically, stress that occurs in the supporter 33A is reduced further in the optical device 100A illustrated in FIG. 7 than in the optical device 100 illustrated in FIG. 4(*a*).

As described above, the optical device 100 according to an aspect includes the outermost-layer lens 1 (a light-transparent body), the housing 2, the vibrator 3, and the piezoelectric device 5. The outermost-layer lens 1 is transparent to light of a predetermined wavelength. The housing 2 holds the outermost-layer lens 1. The vibrator 3 is in contact with the outermost-layer lens 1 held by the housing 2. The piezoelectric device 5 is disposed on the vibrator 3, and vibrates the vibrator 3. The vibrator 3 is a tubular body. The vibrator 3 includes the connector 31 (the first portion) that is in contact with the outermost-layer lens 1, the vibrating portion 32 (the second portion) on which the piezoelectric device 5 is disposed, and the supporter 33 (the third portion) that connects the connector 31 (the first portion) and the vibrating portion 32 (the second portion) to each other and that has a curved cross-sectional shape.

In the optical device 100 according to an aspect of the present disclosure, the vibrator 3 is a tubular body, and includes the connector 31 (the first portion) that is in contact with the outermost-layer lens 1, the vibrating portion 32 (the second portion) on which the piezoelectric device 5 is disposed, and the supporter 33 (the third portion) that connects the connector 31 and the vibrating portion 32 to each other and that has a curved cross-sectional shape. The optical device 100 with this structure can thus reduce stress concentration on the vibrator 3, and reduce occurrence of cracks.

Figure 8:
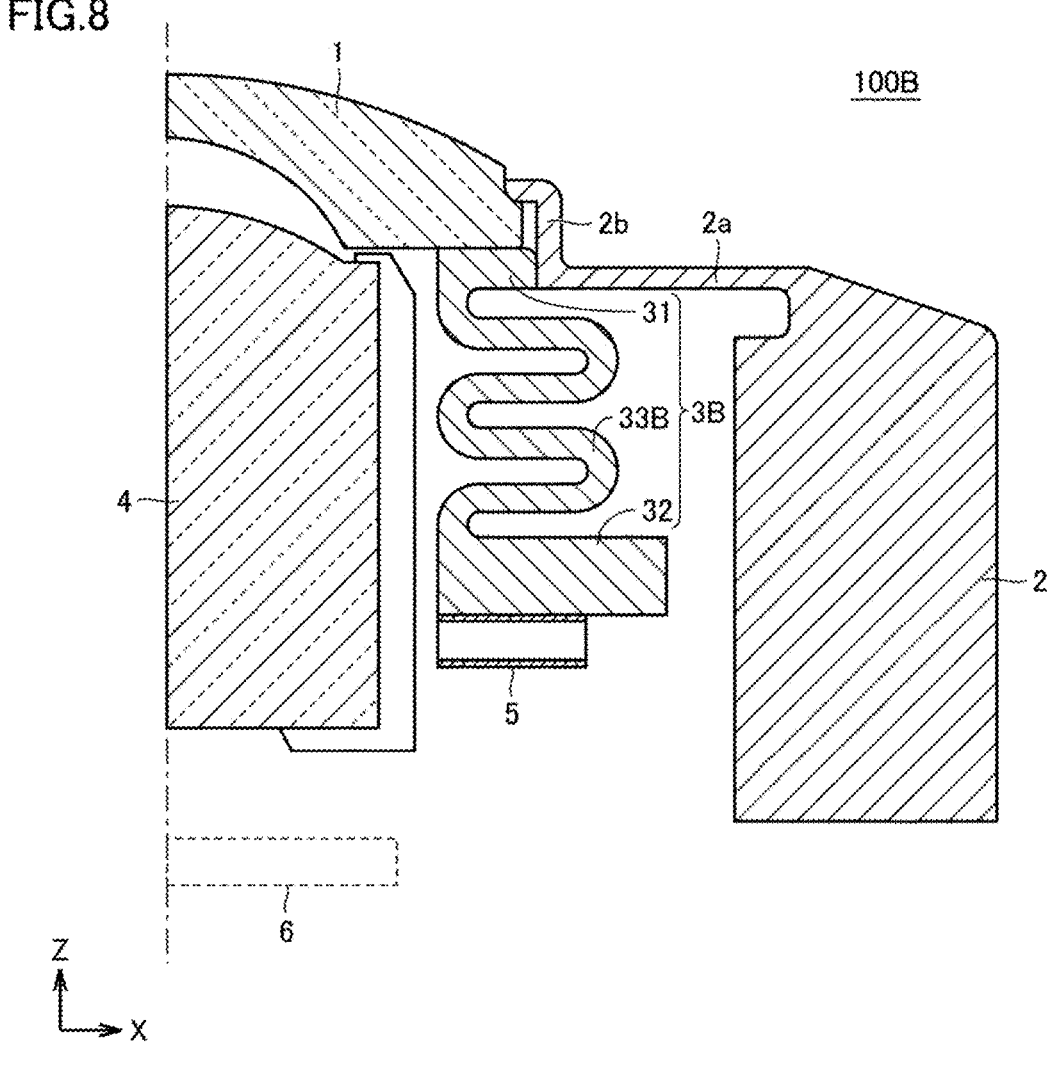
FIG. 8 is a half-sectional view of an optical device in accordance with aspects of the present disclosure.

In the above description of the optical device 100 according to an aspect of the disclosure, the supporter 33 has an S-shaped cross section. However, instead of an S-shaped cross section, the supporter may have any shape that does not cause stress concentration on the vibrator. FIG. 8 is a half-sectional view of an optical device according to a first modification example. In an optical device 100B illustrated in FIG. 8, the same components as those in the optical device 100 illustrated in FIG. 1 are denoted with the same reference signs without being described again. The X-direction and the Z-direction in the drawing indicate the lateral direction and the height direction of the optical device 100B. The dot-and-dash line illustrated in FIG. 8 passes through the center axis of the optical device 100B.

As illustrated in FIG. 8, the optical device 100B includes an outermost-layer lens 1, a housing 2, a vibrator 3B, an inner-layer lens 4, and a piezoelectric device 5. The vibrator 3B is a tubular body, and includes a connector 31 (a first portion) that is in contact with the outermost-layer lens 1, a vibrating portion 32 (a second portion) on which the piezoelectric device 5 is disposed, and a supporter 33B (a third portion) that connects the connector 31 and the vibrating portion 32 to each other. The supporter 33B has a cross-sectional shape obtained by connecting multiple Ss. The inner-layer lens 4 is disposed inside the vibrator 3B, as illustrated in FIG. 8.

The supporter 33B has a cross-sectional shape obtained by connecting multiple Ss. Thus, vibrating the piezoelectric device 5 can vibrate the outermost-layer lens 1 in a piston manner in the Z-direction. The supporter 33B illustrated in FIG. 8 has a cross-sectional shape obtained by connecting two Ss, but may have cross-sectional shape obtained by connecting three or more Ss. The supporter may have any cross-sectional shape that reduces stress concentration, and thus may have a curved cross-sectional shape including a half of an S.

In the above description, each of the vibrators 3, 3A, and 3B includes the connector 31 (the first portion), the vibrating portion 32 (the second portion), and any one of the supporters 33, 33A, and 33B (the third portion). To further reduce portions in the vibrator 3, 3A, or 3B on which stress concentrates, preferably, the connection portion between the connector 31 and the corresponding one of the supporters 33, 33A, and 33B and the connection portion between the vibrating portion 32 and the corresponding one of the supporters 33, 33A, and 33B have a curved shape, in addition to the corresponding one of the supporters 33, 33A, and 33B having a curved cross-sectional shape.

Figure 9:
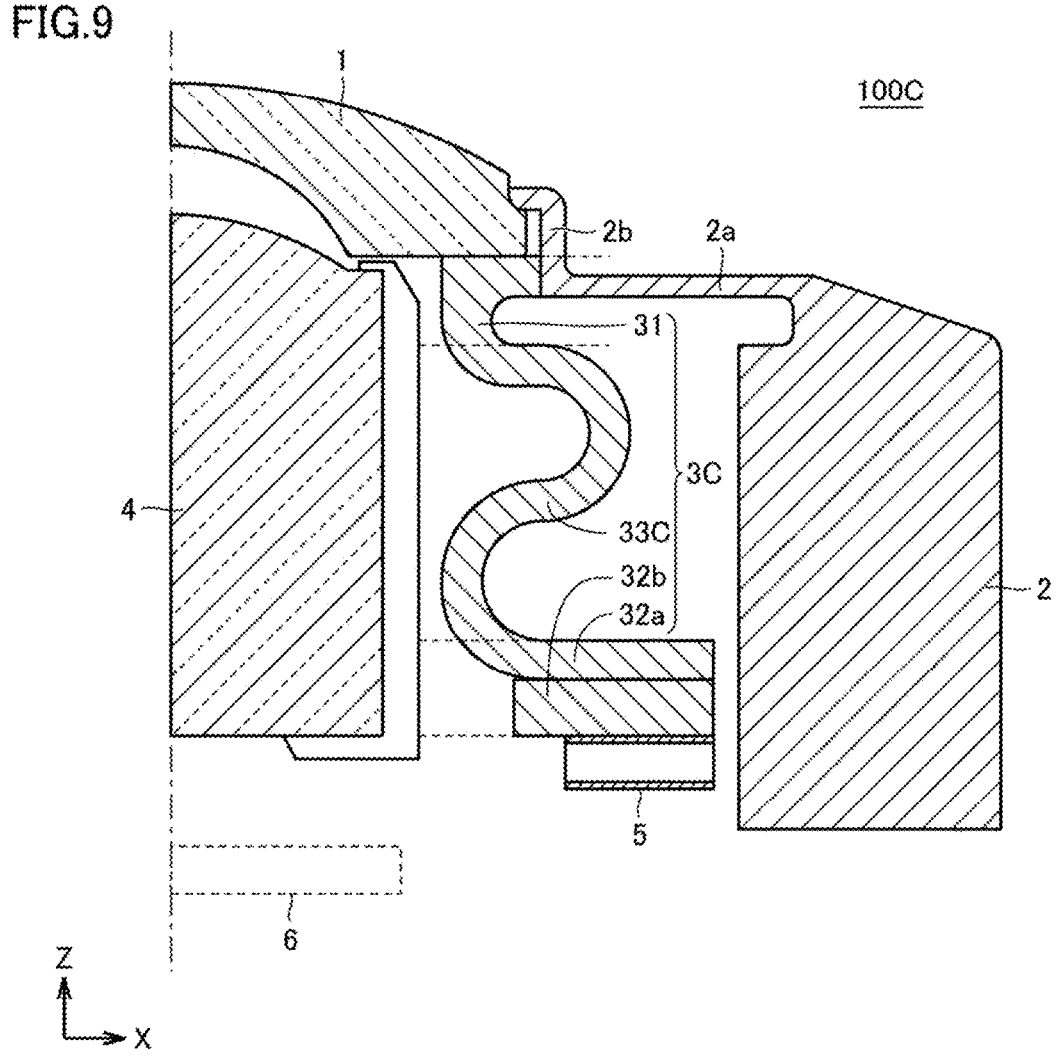
FIG. 9 is a half-sectional view of an optical device in accordance with aspects of the present disclosure.

As described above with regards to the optical device 100 according to an aspect of the disclosure, the vibrating portion 32 of the vibrator 3 has a larger thickness than the connector 31 and the supporter 33. However, processing such as pressing, which is performed at lower costs than cutting, is not suitable to manufacture a vibrator having portions with different thicknesses. To address this, the optical device according to the second modification example includes a vibrator manufacturable by processing such as pressing. FIG. 9 is a half-sectional view of an optical device 100C according to a second modification example. In the optical device 100C illustrated in FIG. 9, the same components as those in the optical device 100 illustrated in FIG. 1 are denoted with the same reference signs without being described again. The X-direction and the Z-direction in the drawing indicate the lateral direction and the height direction of the optical device 100C. The dot-and-dash line illustrated in FIG. 9 passes through the center axis of the optical device 100C.

As illustrated in FIG. 9, the optical device 100C includes an outermost-layer lens 1, a housing 2, a vibrator 3C, an inner-layer lens 4, and a piezoelectric device 5. The vibrator 3C is a tubular body, and includes a connector 31 (a first portion) that is in contact with the outermost-layer lens 1, a vibrating portion 32a (a second portion) on which the piezoelectric device 5 is disposed, a supporter 33C (a third portion) that connects the connector 31 and the vibrating portion 32a to each other, and a weight 32b. The connector 31, the vibrating portion 32a, and the supporter 33C in the vibrator 3C have a uniform thickness to be formed by processing such as pressing at low costs. The connector 31, the vibrating portion 32a, and the supporter 33C may be integrated with one another, or formed separately.

However, the vibrating portion 32a with a reduced thickness lowers the function as a weight as in the vibrating portion 32 of the vibrator 3. Thus, to supplement the function of the vibrating portion as a weight, the vibrator 3C includes the weight 32b processed separately from the vibrating portion 32a, between the vibrating portion 32a and the piezoelectric device 5. The vibrating portion 32a and the weight 32b are joined with an adhesive or by screwing. The piezoelectric device 5 is disposed on the surface of the weight 32b opposite to the surface located closer to the surface that is in contact with the vibrating portion 32a, but instead may be disposed on the surface of the vibrating portion 32a opposite to the surface located closer to the surface that is in contact with the weight 32b. Alternatively, the piezoelectric device 5 may be disposed on the same surface of the vibrating portion 32a on which the weight 32b is in contact. With such an arrangement of the piezoelectric device 5 and the weight 32b with respect to the vibrating portion 32a, the optical device 100C has increased freedom of design while allowing the vibrator 3C and the optical device 100C to have a reduced height. The weight 32b and the piezoelectric device 5 may have substantially the same dimensions in the radial direction.

Figure 10:
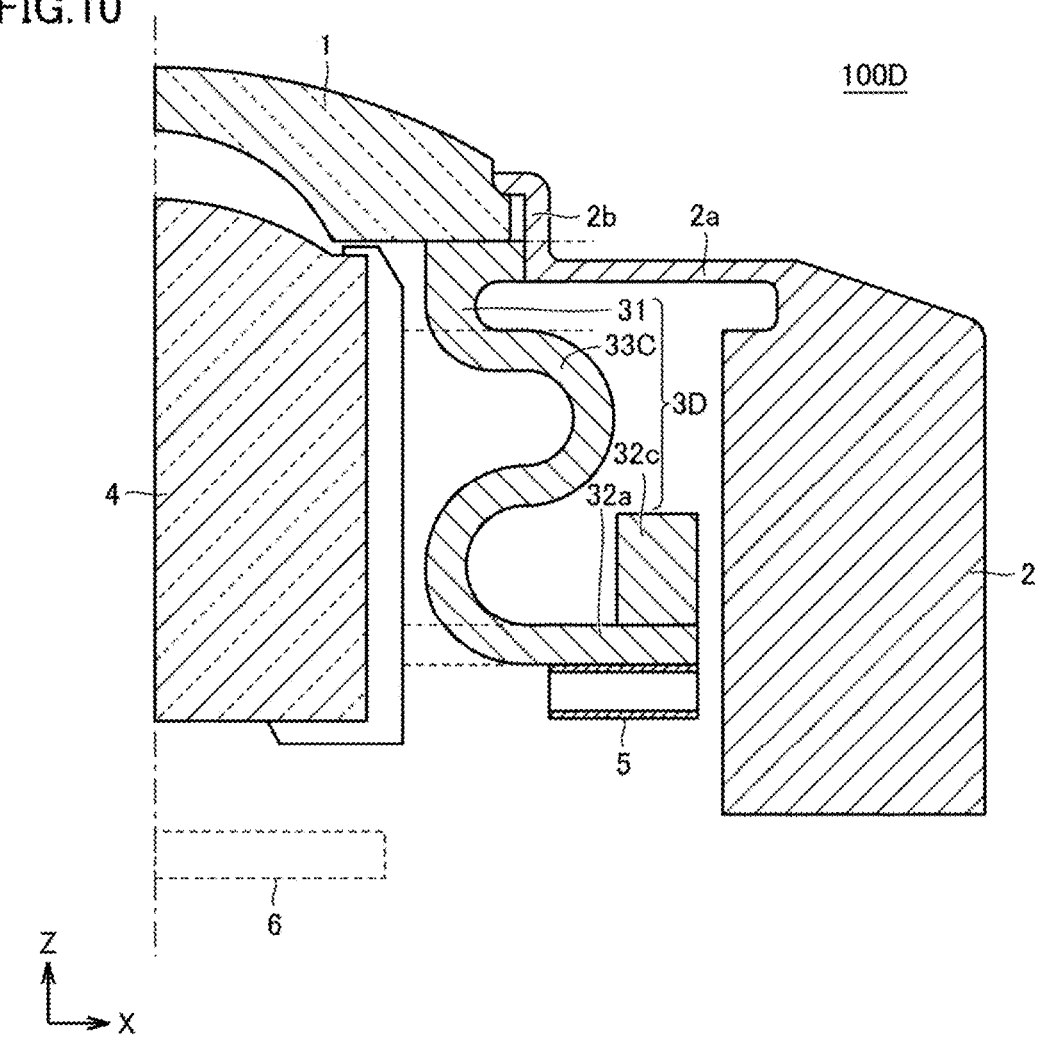
FIG. 10 is a half-sectional view of an optical device in accordance with aspects of the present disclosure.

In the optical device 100C according to the second modification example, the weight 32b of the vibrator 3C is disposed on the surface of the vibrating portion 32a opposite to the surface located closer to the surface that is in contact with the outermost-layer lens 1. Instead, a weight 32c may be disposed on the surface of the vibrating portion 32a located closer to the surface that is in contact with the outermost-layer lens 1. FIG. 10 is a half-sectional view of an optical device 100D according to a third modification example. In the optical device 100D illustrated in FIG. 10, the same components as those in the optical device 100 illustrated in FIG. 1 are denoted with the same reference signs without being described again. The X-direction and the Z-direction in the drawing indicate the lateral direction and the height direction of the optical device 100D. The dot-and-dash line illustrated in FIG. 10 passes through the center axis of the optical device 100D.

As illustrated in FIG. 10, the optical device 100D includes an outermost-layer lens 1, a housing 2, a vibrator 3D, an inner-layer lens 4, and a piezoelectric device 5. The vibrator 3D is a tubular body, and includes a connector 31 (a first portion) that is in contact with the outermost-layer lens 1, a vibrating portion 32a (a second portion) on which the piezoelectric device 5 is disposed, a supporter 33C (a third portion) that connects the connector 31 and the vibrating portion 32a to each other, and a weight 32c. The connector 31, the vibrating portion 32a, and the supporter 33C in the vibrator 3D have a uniform thickness to be formed by processing such as pressing at low costs. The connector 31, the vibrating portion 32a, and the supporter 33C may be integrated with one another, or formed separately.

Thus, to supplement the function as a weight of the vibrating portion, the vibrator 3D includes the weight 32c processed separately from the vibrating portion 32a, on the surface of the vibrating portion 32a located closer to the surface that is in contact with the outermost-layer lens 1. The vibrating portion 32a and the weight 32c are joined with an adhesive or by screwing. The piezoelectric device 5 is disposed on the surface of the vibrating portion 32a opposite to the surface located closer to the surface that is in contact with the outermost-layer lens 1, but instead may be disposed on the surface of the vibrating portion 32a with which the weight 32c is in contact, or on the surface of the weight 32c located closer to the surface that is in contact with the outermost-layer lens 1 (may have a structure in which the weight 32c and the piezoelectric device 5 are stacked on top of the vibrating portion 32a). With such an arrangement of the piezoelectric device 5 and the weight 32c with respect to the vibrating portion 32a, the optical device 100D has increased freedom of design while allowing the vibrator 3D and the optical device 100D to have a reduced height. The weight 32c and the piezoelectric device 5 may have substantially the same dimensions in the radial direction.

The above-described image pickup unit according to one or more aspects may include a camera, light detection and ranging (LiDAR), or a radar. In addition, multiple image pickup units may be arranged.

The above-described image pickup unit according to one or more aspects is not limited to an image pickup unit installed on a vehicle, and may be similarly applicable to any image pickup unit that includes an optical device and an image pickup device disposed to have a light-transparent body in its field of view and that involves removal of foreign matter on the light-transparent body.

The aspects disclosed herein are intended in all respects to be illustrative rather than restrictive. The scope of the present disclosure is defined by the scope of claims, not by the above description, and is intended to include the scope equivalent to the scope of claims and all the changes within the scope.

In general, the description of the aspects disclosed should be considered as being illustrative in all respects and not being restrictive. The scope of the present disclosure is shown by the claims rather than by the above description, and is intended to include meanings equivalent to the claims and all changes in the scope. While preferred aspects of the invention have been described above, it is to be understood that variations and modifications will be apparent to those skilled in the art without departing from the scope and spirit of the invention.

DESCRIPTION OF REFERENCE SYMBOLS 1 outermost-layer lens
2 housing
3 vibrator
4 inner-layer lens
5 piezoelectric device
6 image pickup device
31 connector
32 vibrating portion
33, 33A, 33B supporter
100, 100A, 100B optical device

US 12,693,527 B2

11

The invention claimed is:

1. An optical device, comprising:
a light-transparent body transparent to light of a predetermined wavelength;
a housing configured to hold the light-transparent body;
a vibrator in contact with the light-transparent body configured to be held by the housing; and
a piezoelectric device disposed on the vibrator and configured to vibrate the vibrator,
wherein the vibrator is a tubular body, and includes a first portion that is in contact with the light-transparent body, a second portion on which a piezoelectric device is disposed, and a third portion that connects the first portion to the second portion and that has a curved cross-sectional shape.

2. The optical device according to claim 1, wherein the first portion in the vibrator includes a shape extending in an axial direction of the tubular body.

3. The optical device according to claim 1, wherein the second portion in the vibrator includes a shape extending in a radial direction of the tubular body.

4. The optical device according to claim 3, wherein an end portion of the second portion is located further outward from a remaining portion of the tubular body.

5. The optical device according to claim 1, wherein the third portion in the vibrator includes a S-shaped cross section.

6. The optical device according to claim 5, wherein a portion of the third portion located closer to the second portion includes a larger radius of curvature than a portion of the third portion located closer to the first portion.

7. The optical device according to claim 1, wherein, in the vibrator, the second portion has a larger thickness than the first portion or the third portion.

8. The optical device according to claim 1, wherein, when vibrated by the piezoelectric device, the vibrator has a vibration node at a middle portion of the third portion extending from the first portion to the second portion.

9. The optical device according to claim 1, wherein the first portion, the second portion, or the third portion in the vibrator are integrated with one another.

10. The optical device according to claim 1, wherein the vibrator includes a shape in which a connection point between the light-transparent body and the first portion, a connection point between the first portion and the third portion, or a connection point between the third portion and the second portion are disposed on a straight line.

11. An image pickup unit, comprising:
an optical device comprising:
a light-transparent body being transparent to light of a predetermined wavelength;
a housing configured to hold the light-transparent body;
a vibrator in contact with the light-transparent body configured to be held by the housing; and
a piezoelectric device disposed on the vibrator and configured to vibrate the vibrator,
wherein the vibrator is a tubular body, and includes a first portion that is in contact with the light-transparent body, a second portion on which a piezoelectric device is disposed, and a third portion that connects the first portion to the second portion and that has a curved cross-sectional shape; and
an image pickup device disposed to have the light-transparent body in a field of view.

12. The image pickup unit according to claim 11, wherein the first portion in the vibrator includes a shape extending in an axial direction of the tubular body.

13. The image pickup unit according to claim 11, wherein the second portion in the vibrator includes a shape extending in a radial direction of the tubular body.

14. The image pickup unit according to claim 13, wherein an end portion of the second portion is located further outward from a remaining portion of the tubular body.

15. The image pickup unit according to claim 11, wherein the third portion in the vibrator includes a S-shaped cross section.

16. The image pickup unit according to claim 15, wherein a portion of the third portion located closer to the second portion includes a larger radius of curvature than a portion of the third portion located closer to the first portion.

17. The image pickup unit according to claim 11, wherein, in the vibrator, the second portion has a larger thickness than the first portion or the third portion.

18. The image pickup unit according to claim 11, wherein, when vibrated by the piezoelectric device, the vibrator has a vibration node at a middle portion of the third portion extending from the first portion to the second portion.

19. The image pickup unit according to claim 11, wherein the first portion, the second portion, or the third portion in the vibrator are integrated with one another.

20. The image pickup unit according to claim 11, wherein the vibrator includes a shape in which a connection point between the light-transparent body and the first portion, a connection point between the first portion and the third portion, or a connection point between the third portion and the second portion are disposed on a straight line.

* * * * *